United States Patent [19]

Metzger

[11] 4,128,478

[45] Dec. 5, 1978

[54] PARTS WASHER

[76] Inventor: Herman U. Metzger, R.R. 4, Box 18, Goshen, Ind. 46526

[21] Appl. No.: 700,879

[22] Filed: Jun. 29, 1976

[51] Int. Cl.[2] ....................... B01D 33/18; B01D 29/12

[52] U.S. Cl. .................................... 210/167; 134/111; 210/482

[58] Field of Search ............... 210/167, 257, 338, 337, 210/498, 258, 416, 482; 134/56, 99, 111

[56] References Cited

U.S. PATENT DOCUMENTS

| | | | |
|---|---|---|---|
| 970,398 | 9/1910 | Sapp et al. | 210/485 X |
| 1,035,680 | 8/1912 | Boesel | 210/485 |
| 1,585,246 | 5/1926 | Hoy | 210/485 X |
| 3,020,918 | 2/1962 | Albertson et al. | 134/111 X |
| 3,177,945 | 4/1965 | Fether | 210/498 X |
| 3,378,019 | 4/1968 | Riolo et al. | 134/111 |
| 3,522,814 | 8/1970 | Olson | 134/111 |
| 3,774,769 | 11/1973 | Smith | 210/232 |
| 3,890,988 | 6/1975 | Lee | 134/111 |
| 3,960,728 | 6/1976 | Olson | 134/111 |
| 3,970,560 | 7/1976 | Metzger | 134/111 |

*Primary Examiner*—Theodore A. Granger

*Attorney, Agent, or Firm*—Woodard, Weikart, Emhardt & Naughton

[57] ABSTRACT

Apparatus for washing parts such as mechanical parts using a cleaning solvent. A sink is provided to receive the dirty solvent which flows down a drain into a filter apparatus which includes a pair of concentric cylindrical containers positioned one inside the other and arranged to provide a circuitous path for washing solvent. Inside the inner cylindrical container is a bag which has the function of a filter element and also acts as a container for the dirt and other material filtered out of the solvent.

9 Claims, 4 Drawing Figures

PARTS WASHER

BACKGROUND OF THE INVENTION

1. Field of the Invention

This inventon relates to parts washing apparatus of the type wherein the washing fluid is filtered and recirculated.

2. Description of the Prior Art

Many types of apparatus have been proposed for removing dirt, grease, or particulate matter from different types of parts such as mechanical parts, particularly in the manufacturing and automotive repair fields. Among the apparatus proposed are solvent pump and nozzle systems utilizing solvent recirculation including filter systems for solvent of the type wherein the pumped solvent is forced through a screen type filter. Examples of such devices are shown in U.S. Pat. Nos. 3,439,689 to Zadron et al and 3,679,483 to Zweig.

Other systems provide for dipping parts in the solvent rather than providing circulation and filtering. Various apparatus showing dipping or rotation of parts to be washed in a solvent bath include U.S. Pat. Nos. 2,808,064 to Kearney, 3,029,929 to Kearney et al and 3,154,084 to McKee. One common type of apparatus for cleaning mechanical parts is disclosed in U.S. Pat. No. 3,522,814 to Olson. This apparatus is intended for use in mechanical service industries, particularly in automotive parts repair and replacement and like services. In the Olson apparatus, a parts washing area is provided with a filter element positioned beneath the parts washing area through which the used solvent flows into a receptacle from whence it is pumped by a solvent pump back through the parts washing area. In this apparatus, the solvent, as it is used, continuously flows through the filter element and accumulated particles beneath the parts washing area. Still another apparatus for cleaning mechancial parts is shown in the U.S. Pat. No. 3,352,310 to Doyscher. In the Doyscher apparatus, the dirt drops directly into the bottom of a receptacle where it must be scooped out and where it is in the path of the solvent as it moves through the receptacle.

SUMMARY OF THE INVENTION

One embodiment of the invention might include a parts washing apparatus having a sink with a drain. There is provided a filter apparatus for washing fluid having an inlet and coupled to the sink drain, the filter apparatus includes a first receptacle and a bag in the first receptacle. The sink drain is positioned to flow washing fluid into the bag. The first receptacle has an upper portion with an opening therein which is covered by the bag. There is also provided a second receptacle having the first receptacle contained therein. The bag is capable of passing washing fluid therethrough from the first receptacle through the opening into the second receptacle while filtering particles from the washing fluid and retaining them in the bag. There is also provided means for pumping filtered washing fluid from the second receptacle to the sink for washing parts.

Objects of invention are to provide an improved parts washer, to provide a parts washer that includes safety features, thereby reducing the chances of fire, and to provide a parts washer that is easily maintained.

DESCRIPTION OF THE PREFERRED EMBODIMENT

Figure 1:
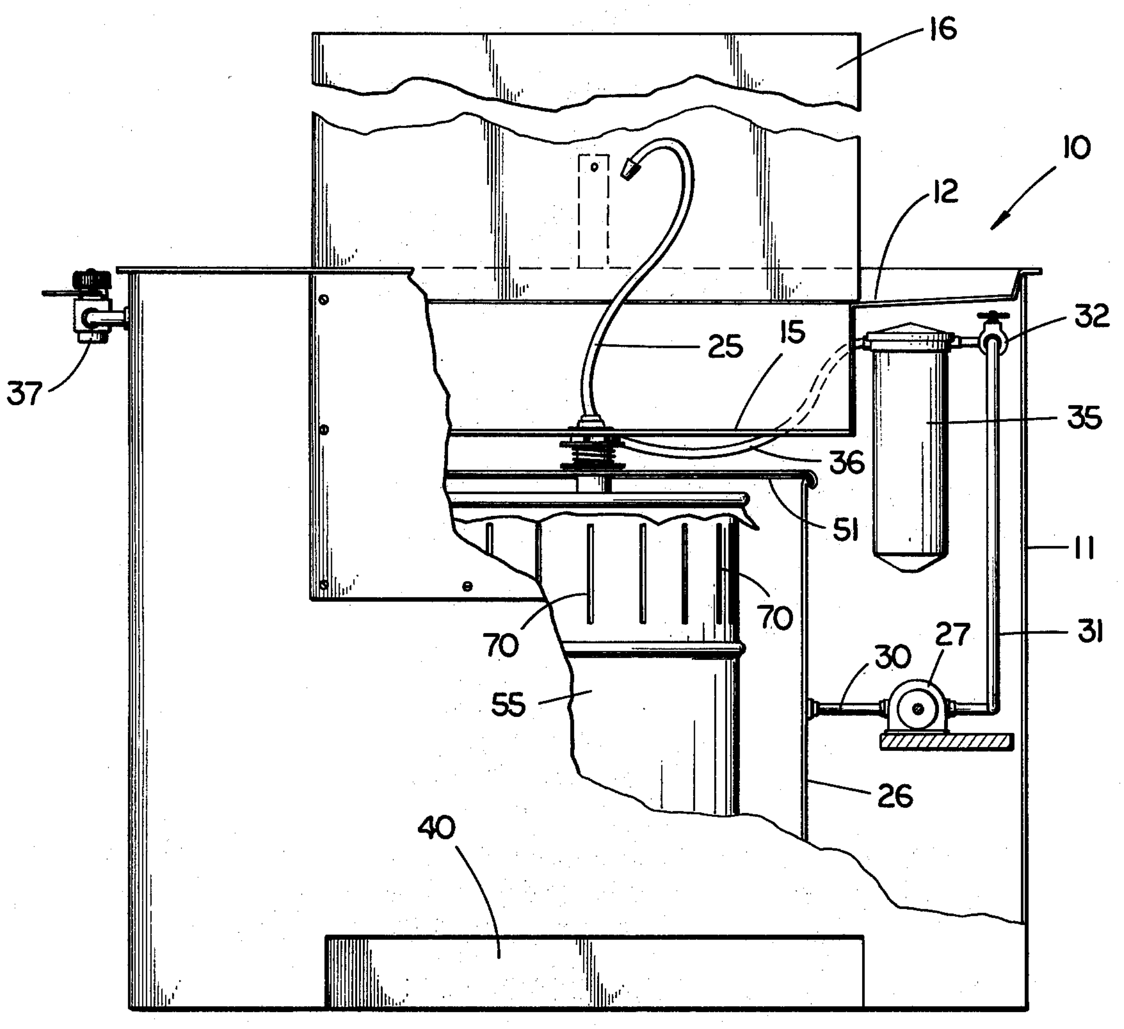
FIG. 1 is a front elevation of the parts washer of the present invention, but with certain portions broken away to show internal construction.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
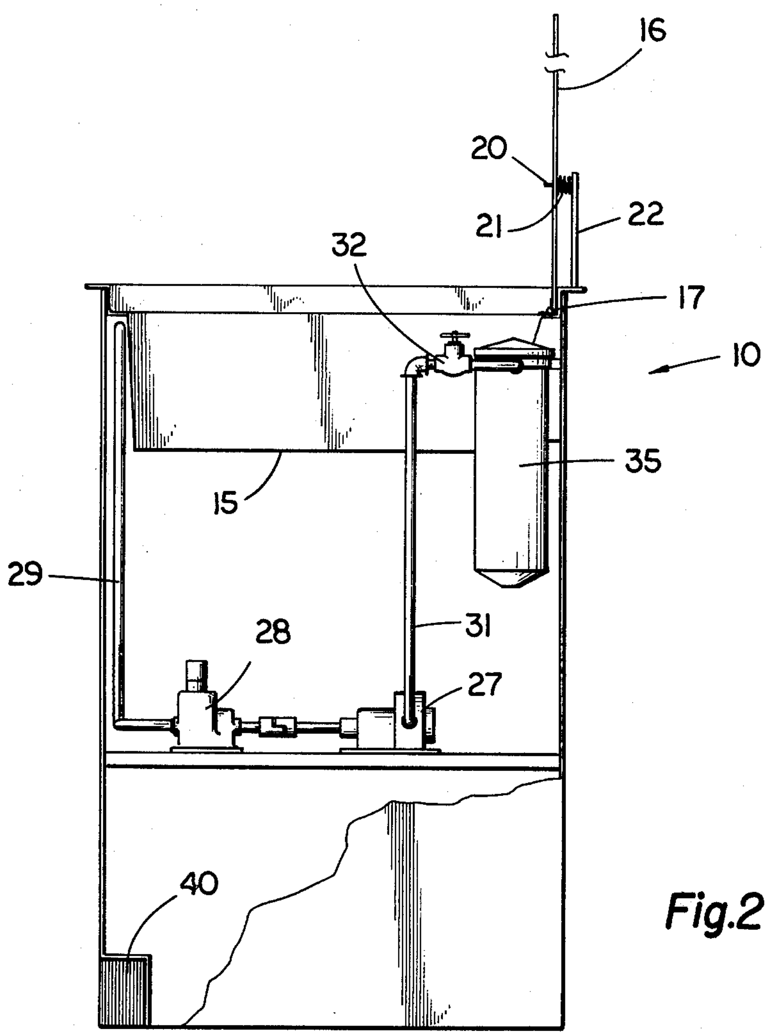
FIG. 2 is a side elevation of the parts washer of FIG. 1 again with certain portions broken away to show internal construction.

Referring to FIG. 1, there is illustrated a parts washing apparatus 10 which includes a cabinet 11 having formed as a part thereof a pair of sideboards 12 (only one shown in FIG. 1) which slope into a sink 15. The sink has a back splash lid 16 which may closed down over the sink. The back splash lid 16 is hingedly mounted at 17 (FIG. 2) on the cabinet 11 and may be secured in an upward position as shown behind the sink by a nut 20 received upon a screwthreaded member 21 projecting from the upright support 22 mounted to the cabinet. A flexible hose 25 is fixedly mounted to the sink 15 and functions to provide solvent for use in the sink and on the sideboards 12 to wash parts and other objects.

Solvent is provided to the flexible hose 25 from a reservoir barrel or receptacle 26 by means of a pump 27. The pump 27 pumps the solvent through a conduit 30 into the pump and through a conduit 31 through a valve 32 thence into a filter 35 and then through a flexible hose 36 coupled to the hose 25. The pump 27 is preferably operated by an air motor 28 which receives air through the line 29 at regulated pressure from the air pressure regulator 37. In one embodiment of the invention, the pump 27 is a Teal pump IP767 while the regulator 37 is a Norgren RO4200 and the air motor is a Gast 2AM-FCC1. The valve 32 is a Bellows M204-247-21 while the filter 35 is a Fulflo 10 $\frac{3}{4}$ 15R10.

It should be noted that one of the features designed into the present apparatus which is particularly comfortable to the mechanic is the recess 40 provided in the lower portion of the cabinet where the mechanic can place his toes so that he is immediately adjacent to the sink for working in the sink and on the sideboards.

Figure 4:
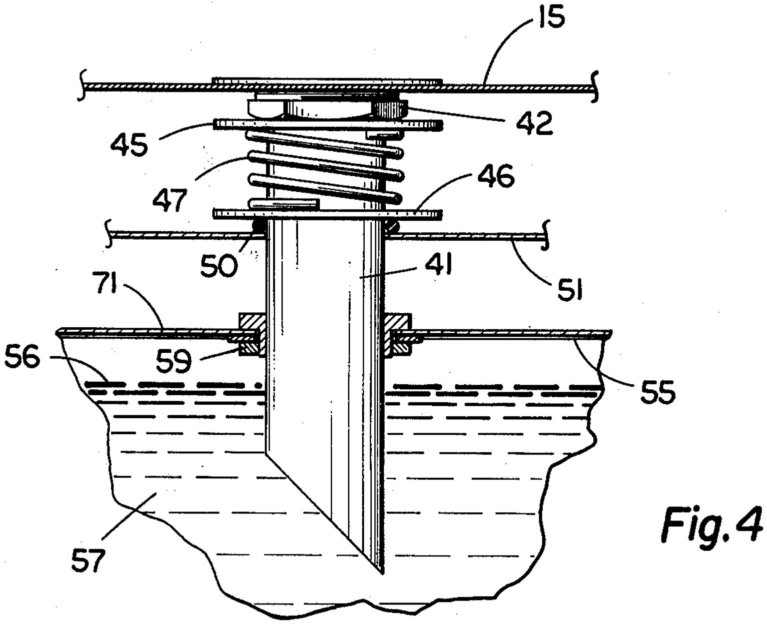
FIG. 4 is an enlarged side elevation of the coupling between the sink drain and the filter apparatus of the present invention.

Referring to FIG. 4, the sink 15 is provided with a drain 41. The drain 41 is fixed to the sink 15 by means of a nut 42 which threads onto drain 41. There is slidably received on the drain 41 a pair of washers 45 and 46 between which is located a compression spring 47. The compression spring 47 forces the lower washer 46 against an O-ring seal 50 which functions to seal the drain 41 to the top 51 of the reservoir barrel 26. It should be noted that the top 51 closes the receptacle 26 but not in air tight fashion. Thus, the interior of the barrel 26 is at atmospheric pressure.

The drain 41 projects downwardly a sufficient distance into a filter canister or receptacle 55 so that it is below the upper surface 56 of the cleaning solvent 57 in the canister or receptacle 55. The receptacle 55 has an opening therein which is bounded by a flexible gasket 59 that provides a seal with the drain 41. Because of the fact that the drain 41 projects below the surface of the cleaning solvent, the fumes of the solvent are less able to pass upwardly through the drain, thus acting to reduce any fire hazard. It should be mentioned that the spring arrangement including the spring 47 may be held in place by a pin at such time as the sink 15 is lifted upwardly in order to clean the filter receptacle 55. The sink 15 and the sideboards 12 are not fixed to the remaining portion of the cabinet but may be lifted upwardly away from the cabinet for such cleaning operation.

Figure 3:
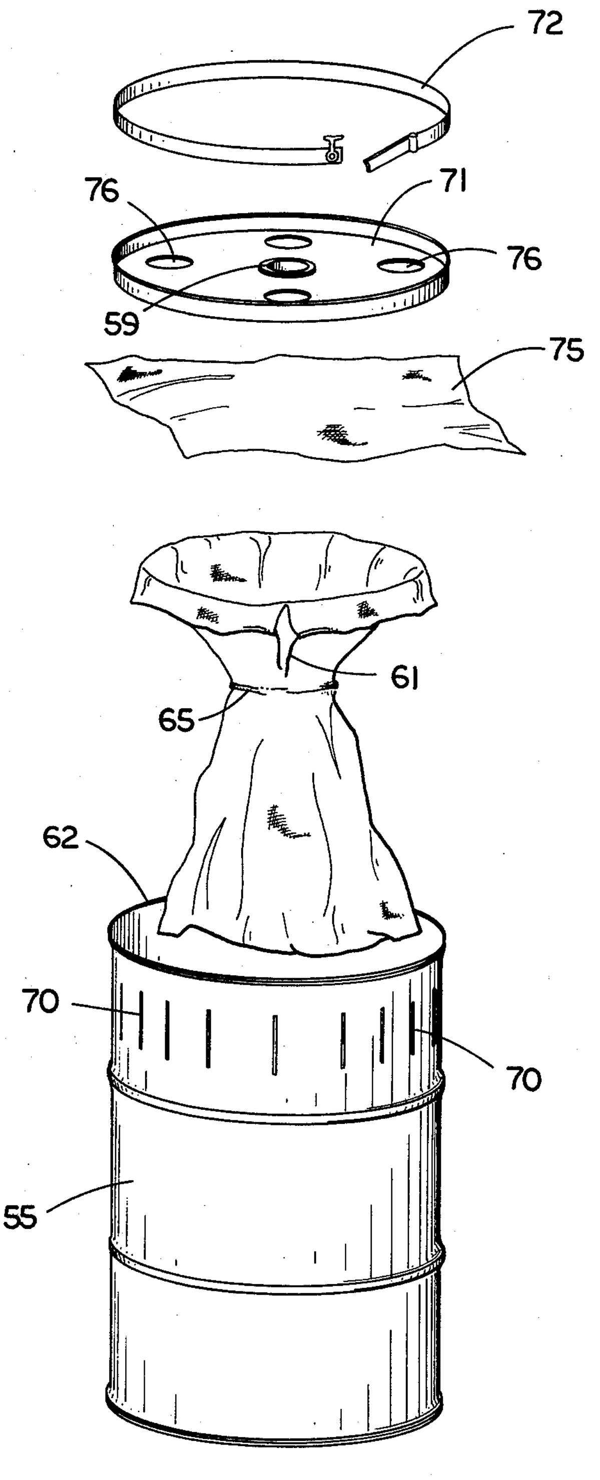
FIG. 3 is a perspective view of certain portions of the filter apparatus forming a part of the present invention showing those portions in exploded fashion.

An important feature of the present invention is the fact that the filter bag 60 (FIG. 3) functions to filter dirt and particles from the solvent but also functions to make possible easier removal of the dirt and particles from the parts washer. When the present device is in operation, the filter bag 60 is placed within the filter receptacle 55 with the drawstring 61 of the filter bag surrounding and tied around the upper edge 62 of the filter receptacle. The filter bag 60 may be formed of cloth fabric material such as, for example, 85% polyester and 35% cotton, otherwise known as voile. The bag 60 has a waist 65 sewn therein and completely surrounding the bag at the center thereof so as to hold portions of the bag away from the receptacle 55 and away from the vertical slits 70 in the upper portion of the receptacle 51. The filter canister 55 has a lid 71 which is fixed in place on the canister by a band clamp 72. Prior to placing the lid 71 on top of the receptacle, a cloth mesh filter sheet 75 is placed over the top of the receptacle 55. It should be noted that the lid 71 has openings 76 therein.

As is best shown in FIG. 1, the filter receptacle 55 is located within the reservoir barrel 26. As solvent is used in the sink 15, it flows downwardly through the drain 41 into the receptacle 55. After the solvent enters the receptacle 51 through the drain 41, if flows outwardly through the bag 60 thence through the slits 70 into the outer receptacle or reservoir barrel 26 from whence it is pumped by the pump 27. As the dirt and particles fill the bag 60, the level of the solvent gets higher until finally it may be forced to move out of the receptacle through the cloth mesh 75 and through the openings 76 into the outer barrel 26. Preferably, the bag 60 is removed from the receptacle 51 through routine maintenance procedures prior to its becoming so filled with dirt and particles that the solvent is forced to move out of the openings 76 through the cloth mesh 75.

In the above-mentioned specific embodiment of the invention, the slits 70 are located in the wall of the drum 55 at four inch intervals. Also, the slits terminate sufficiently high in the barrel that the lower end of the drain is always under the solvent. The function of the pressure regulator 37 is to drop the air pressure from line pressure to a desired pressure in order to operate the air motor 28 at the correct speed. The valve 32 is used by the operator to turn the solvent supply on and off. In the above-mentioned specific embodiment, the pump 27 has a built-in bypass so that when the valve 32 is turned off, the pump merely bypasses. The filter 35 in the above-mentioned specific embodiment is merely a standard diesel fuel filter.

It will be evident from the above description that the present invention provides an improved parts washer that includes safety features reducing the chances of fire. It will also be evident that because of the bag 60 the parts washer is easily maintained by removing the bag from time to time and replacing it with a clean bag.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, the filter arrangement of the present invention (the barrel 26 and its contents) may be used in the parts washer disclosed in my pending patent application, Ser. No. 507,941, filed Sept. 20, 1974 now U.S. Pat. No. 3,970,560.

The invention claimed is:

1. Parts washer apparatus comprising:

a sink with drain;

a first receptacle for washing fluid having an inlet end in fluid communication with the sink drain;

a bag in said first receptacle said bag having an upwardly opening mouth also in fluid communication with the sink drain, the mouth of said bag being sealingly connected to the inlet end of said first receptacle;

a plurality of openings located in the upper portion of said first receptacle adjacent said inlet end and spaced apart from an opposite end of said first receptacle;

a second receptacle around said first receptacle and spaced apart therefrom defining a reservoir for filtered fluid flowing from said first receptacle through said openings;

and means for pumping filtered washing fluid from said second receptacle to said sink for washing parts.

2. The parts washing apparatus of claim 1 wherein said bag is made of fabric, a waist cord sewn into said bag and completely surrounding said bag at the center thereof so as to hold portions of said bag away from said first receptacle and said openings therein, said bag having a mouth which has a drawstring tied over and around the inlet end of said first receptacle.

3. The parts washing apparatus of claim 2 wherein said openings are vertical slits disposed around the upper portion of said first receptacle, a lid for said first receptacle, a cloth mesh received between said lid and said first receptacle, and a band clamped around said lid and securing it to said first receptacle and securing said bag and cloth mesh between said lid and said first receptacle, said lid also having openings therein through which said washing fluid can flow into said second receptacle through said cloth mesh.

4. The parts washing apparatus of claim 3 wherein said first receptacle has washing fluid therein, said drain projecting downwardly from said sink and into said first receptacle a sufficient distance so as to project below the level of the washing fluid therein, a top on said second receptacle, an O-ring seal between said top and said drain, and spring means acting between said sink and said O-ring seal and urging it into sealing relation between said top and drain.

5. The parts washing apparatus of claim 1 wherein said first receptacle has washing fluid therein, said drain projecting downwardly from said sink and into said first receptacle a sufficient distance so as to project below the level of the washing fluid therein, a top on said second receptacle, an O-ring seal between said top and said drain, and spring means acting between said sink and said O-ring seal and urging it into sealing relation between said top and drain.

6. The parts washing apparatus of claim 5 wherein said openings are vertical slits disposed around the upper portion of said first receptacle, a lid for said first receptacle, a cloth mesh received between said lid and said first receptacle, and a band clamped around said lid and securing it to said first receptacle and securing said bag and cloth mesh between said lid and said first receptacle, said lid also having openings therein through which said washing fluid can flow into said second receptacle through said cloth mesh.

7. The parts washing apparatus of claim 1 wherein said drain is elongated and projects downwardly from said sink and into said bag and said first receptacle below said openings therein.

8. The parts washing apparatus of claim 7 wherein said first receptacle and said second receptacle are sealingly connected to said drain and apart from said sink.

9. The parts washing apparatus of claim 7 wherein said first receptacle only has openings in the upper portion thereof.

* * * * *